H. W. PUTNAM.
CLOTHES WRINGER.
No. 36,480.  Patented Sept. 16, 1862.
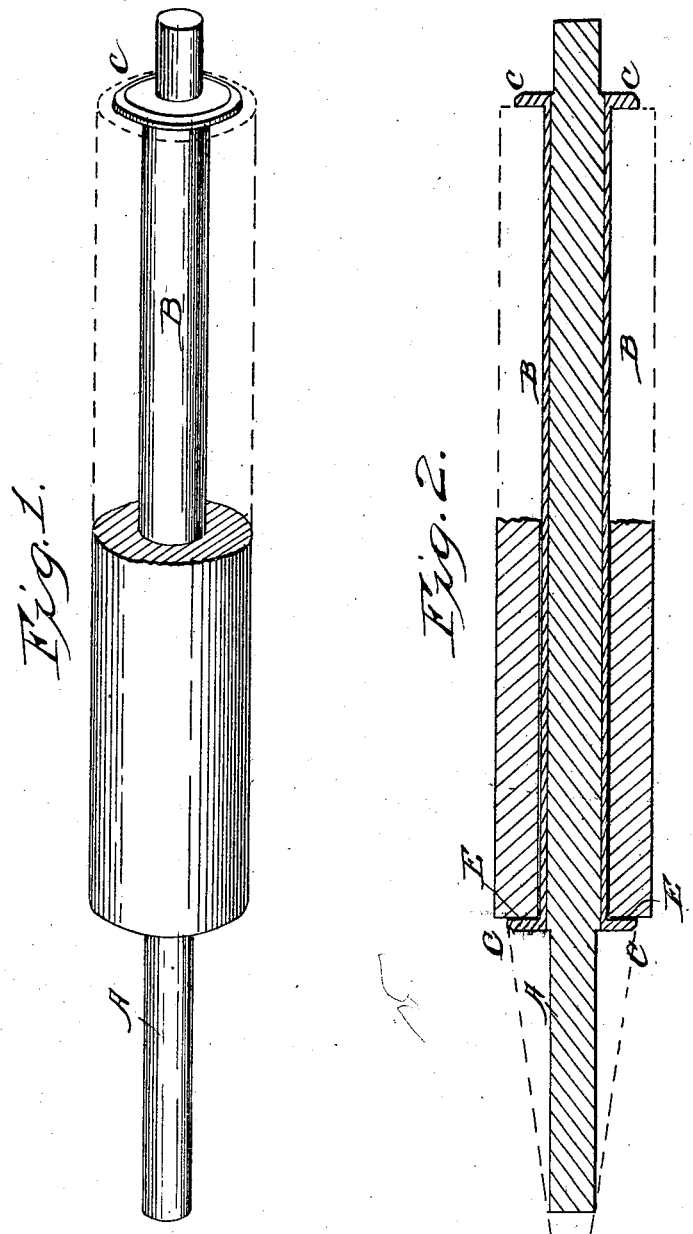
Witnesses:
Inventor

UNITED STATES PATENT OFFICE.

H. W. PUTNAM, OF CLEVELAND, OHIO.

IMPROVED CLOTHES-WRINGER.

Specification forming part of Letters Patent No. 36,480, dated September 16, 1862.

*To all whom it may concern:*

Be it known that I, H. W. PUTNAM, of Cleveland, in the county of Cuyahoga and State of Ohio, have invented certain new and useful Improvements in Rollers for Wringing-Machines; and I do hereby declare that the following is a full and complete description of the construction and operation of the same, reference being had to the accompanying drawings, making a part of this specification, in which—

Fig 1 is a perspective view. Fig. 2 is a sectional view.

Like letters of reference refer to like parts in the two views.

The nature of my invention relates to the mode of attaching vulcanized rubber rollers to iron shafts for wringing-machines and other similar structures, by means of which all corrosion is avoided and the adhesion of the rubber to the shaft is permanent.

By means of my improvement I also avoid the necessity of placing a collar on the shaft after the rubber tube is drawn upon the shaft.

A, Figs. 1 and 2, is the iron shaft. The journals are first turned, and that part to be covered by the rubber tubing is incased in a metallic mold, which fits accurately around the journals to prevent the escape of the melted metal, leaving a space on all sides of the iron shaft. I then pour into this mold an alloy of tin and zinc or lead and antimony, or any other alloy that will melt at from 300° to 600° Fahrenheit, which in this manner completely incases the iron shafts. Each end expands into a flange, C, forming the collar against which the ends of the rubber rest, as at E', Fig. 2.

F is the rubber tubing, which is drawn over the flange C by means of a cone temporarily introduced upon the shaft A, the elastic tube retracting as soon as it passes the flange. The alloy casing B, by being coated with dissolved india-rubber, causes the cylinder and core to adhere permanently.

The advantages of this improvement are as follows: The vulcanized rubber contains sulphur, which corrodes the iron shaft when the two are in contact in the presence of moisture, which soon loosens the rubber from the shaft; but with my improvement this corroding will not take place, for the rubber is not in contact with a metal that is readily acted upon by the sulphur.

What I claim as my improvement, and desire to secure by Letters Patent, is—

Casting around the body of the iron shaft an alloy of metal with collars, substantially as described, this alloy covering being interposed between the iron shaft and the rubber covering, for the purpose of protecting the iron shaft from the corrosive action of the sulphur contained in the vulcanized rubber, as herein specified.

H. W. PUTNAM.

Witnesses:
 J. BRAINERD,
 S. H. MATHER.